United States Patent [19]

Liu

[11] Patent Number: 5,672,850
[45] Date of Patent: Sep. 30, 1997

[54] WEIGHT SENSOR WITH ELECTROSTATIC CAPACITANCE

[76] Inventor: Chung-Kuang Liu, P.O. Box 10780, Taipei, Taiwan

[21] Appl. No.: 457,579

[22] Filed: Jun. 1, 1995

[51] Int. Cl.[6] .................................................. G01G 3/14
[52] U.S. Cl. ........................................................ 177/210 C
[58] Field of Search ............................ 177/210 C, 229; 73/862.626, 862.68, 862.046; 361/280, 281

[56] References Cited

U.S. PATENT DOCUMENTS

| | | | |
|---|---|---|---|
| 4,366,875 | 1/1983 | Dauge et al. | 177/210 C |
| 4,846,294 | 7/1989 | Sato | 177/210 C |
| 4,856,603 | 8/1989 | Murakoso et al. | 177/210 C |
| 4,951,764 | 8/1990 | Brand | 177/210 C |

Primary Examiner—Michael L. Gellner
Assistant Examiner—Randy W. Gibson

[57] ABSTRACT

An electrostatic capacitance type weight sensor includes a sheet-like upper support plate and a sheet-like lower support plate with their respective end portions secured together and having a pair of electrodes sandwiched therebetween. The upper support plate is coupled to a loaded element. Either sides of the upper and lower support plates adjacent their respective end portions are provided with bridge type elastic arms having a surface area smaller than that of a central portion of the upper support plate and the lower support plates. When the loaded element carries a load, causing one of the end portions of the upper support plate and the lower support plate to displace downwardly, the elastic arms flex in compensation so that the electrodes remain parallel to each other even when the space therebetween varies, thus enhancing measuring precision in addition to providing a thin and easily assembled weight sensor.

6 Claims, 5 Drawing Sheets

WEIGHT SENSOR WITH ELECTROSTATIC CAPACITANCE

BACKGROUND OF THE INVENTION

1. Field of the Invention

The present invention relates generally to a weight sensor, and particularly to an electrostatic capacitance type weight sensor.

2. Description of the Prior Art

Weight sensors are commonly applied in weighing instruments. Conventional mechanical lever type weight sensors have been gradually replaced by electronic weighing sensors. Electronic weighing sensors have the advantage of better precision; besides, they are provided with digital displays for indicating the weight obtained by digits. However, due to difficult processing, manufacturing costs of electronic weight sensors remain high.

For years, the Roberval mechanism adopted in electronic weighing instruments is a typical example of such instruments. As known to those skilled in the art, a typical Roberval mechanism as shown in FIG. 8 includes a fixed upright 11 coupled to a frame 20, a loaded upright 12 connected to a load carrying plate 10, and two or three horizontal arms 21, 22, 23. Both ends of the arms are perpendicular to the fixed upright 11 and the loaded upright 12 and coupled thereto, forming a deformable parallelogram, so that they may be horizontally secured to parallel electrodes 320 and 343 of the mechanism. The space between the electrodes may deform with the deformation of the parallelogram due to a load Q placed in the loaded upright 12. In other words, the variation in capacitance between the two electrodes 320 and 343 is used as sensed data which are converted into relative digital weight data.

Since the parallelism of the space between the two electrodes 320 and 343 is affected by the deformation of the parallelogram, i.e., the capacitance of each point in between the two electrodes 320 and 343 will vary, making it difficult to determine which point should be taken, hence affecting the weighing precision. The Roberval mechanism described above and shown in FIG. 8 of the accompanying drawings is disclosed in U.S. Pat. No. 4,308,929, which attempts to offer a solution to the above-described problem. As disclosed in said patent, each of the arms 21, 22, 23 is connected to one end of the fixed upright 11 and one end of the loaded upright 12 by its corresponding elastic hinges 211, 212, 221, 222, 231 and 232. These dome-shaped elastic hinges will deform when the loaded upright 12 carries a load, and the corresponding arms will extend their length consequently, so that the space between the two electrodes 320 and 343 remains substantially parallel. A solution to the same problem is also proposed in Japanese Patent Application Laid-open No. 58-176525, which provides a method of lessening biased load errors in electrostatic capacitance type weighing instruments. It teaches the use of fixation screws and long-slot screw holes in securing parts of the electrodes to the struts or uprights so that they may only slightly displace with the load. However, there is the disadvantage that skill is required for such slight adjustments. As for the above-mentioned U.S. Pat. No. 4,308,929, extremely high quality control of materials and expert skills are required in manufacture. Since the precision of the mechanism is determined by the dome-shaped elastic hinges, whether they have the same shape and thickness after finishing, i.e., whether there is a pronounced difference among them, affects the extent of deformation of the parallelogram. As is well known to those skilled in the art of material science and mechanical processing, when grinding the upper surface and lower surface of the mechanism, due to the difference between the rigidity and heat dissipation ability of the elastic hinges and those of the arms, particularly when aluminum alloys are usually utilized to make the mechanism, superb skills or confidential key techniques are required to achieve satisfactory surfaces of the mechanism. Another problem is that, since it is almost impossible to obtain elastic hinges of identical shape and thickness after processing, it is highly difficult to achieve precision of measurement, hence increasing faulty product rates and manufacturing costs. Still another problem is that it is extremely difficult to try to reduce the overall thickness of the weight sensor taught in the U.S. Patent. The problems mentioned above have existed for years without a feasible solution.

U.S. Pat. No. 4,848,294 aims to solve the precision problem existed in the above-mentioned U.S. Pat. No. 4,308,929. It discloses an electrode provided with a plurality of notches to constitute deformable adjusting pieces to effect fine adjustment of errors. Nonetheless, it does not offer a solution to the processing problem in respect of the dome-shaped elastic hinges.

SUMMARY OF THE INVENTION

Therefore, a primary object of the present invention is to provide an extremely precise electrostatic capacitance type weight sensor in which uncontrollable errors will not be incurred during the manufacturing process so that there is no need to employ any means or methods to compensate biased load errors existed in the prior art.

Another object of the present invention is to provide an electrostatic capacitance type weight sensor which is easy to process and assemble and has a reduced overall thickness.

To achieve the aforementioned objects, the electrostatic capacitance type weight sensor according to the present invention comprises a sheet-like upper support plate and a sheet-like lower support plate placed one on top of the other and secured together at their two ends, a pair of electrodes being sandwiched therebetween, the upper support plate being coupled to a loaded element, both the upper support plate and the lower support plate having a bridge type elastic arm at either sides thereof adjacent the respective ends, said elastic arm having a surface area smaller than that of a central portion of each support plate, wherein when the loaded element is loaded and causes one end of the upper support plate and the lower support plate to displace downwardly simultaneously, due to the deformation of the elastic arms, the electrodes remain parallel to each other, thus enhancing measuring precision and reducing the overall thickness of the weight sensor while facilitating manufacturing and processing of the weight sensor.

The upper and lower support plates may be directly punched from steel plates and subsequently subjected to heat treatment and grinding to obtain a uniform thickness and suitable elasticity, simplifying the manufacturing process and method. Other components of the invention may also be ground and processed into sheets of uniform thickness, so that there is no need to perform any adjustment or utilize any elements to compensate any errors during assembly.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENTS

Figure 2:
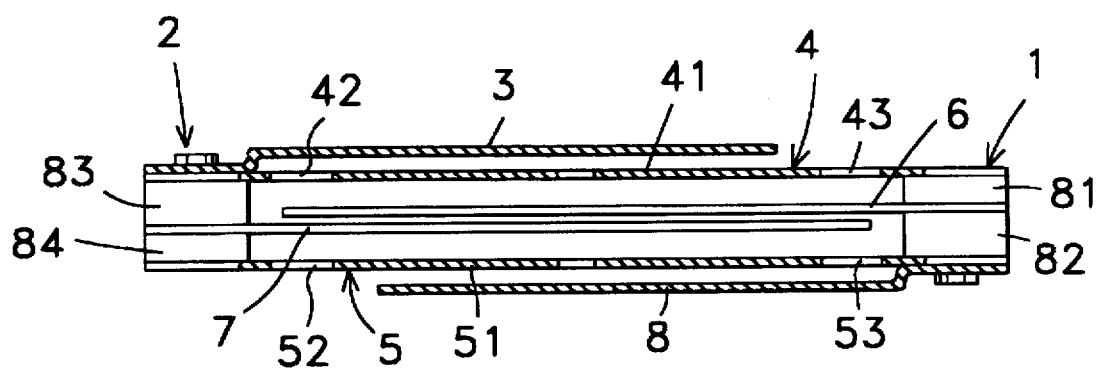
FIG. 2 is a sectional view of the preferred embodiment of the present invention in an assembled state.

A preferred embodiment of the electrostatic capacitance type weight sensor is shown in FIG. 2. It comprises a sheet-like upper support plate 4 and a sheet-like lower support plate 5, both of which are secured together at their two ends, forming a fixed portion 1 and a movable portion 2 perpendicular to the two support plates 4 and 5. A pair of separate but parallel cantilever type electrodes 6 and 7 have one of their respective ends individually sandwiched between the fixed portion 1 and the movable portion 2. In FIG. 2, separate electrodes are held between the upper support plate 4 and the lower support plate 5. Referring to FIG. 5, the upper and lower support plates 4 and 5 each have a central portion 41, 51, which extends to either end portions thereof to form bridge type elastic arms 42, 43 and 52, 53 respectively. The surface area of the elastic arms is smaller than that of the central portions so that they may deform to maintain the parallelism of the space between the electrodes when it varies (see FIG. 4).

Although the cantilever type electrodes 6, 7 may be mounted in pairs below the lower support plate 5 or above the upper support 4, they are preferably arranged between the upper support plate 4 and the lower support plate in a parallel position, as shown in FIG. 2.

Figure 3:
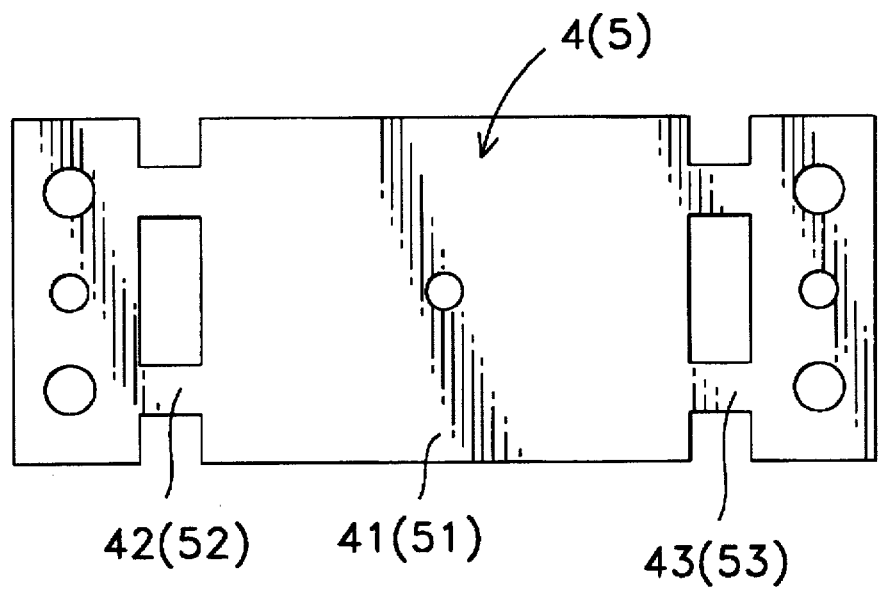
FIG. 3 is a plan view of of a preferred embodiment of the upper or lower support plate according to the present invention.

Reference is made to FIG. 3. FIG. 3 shows a preferred manner of forming the bridge type elastic arms 42, 43 and 52, 53 at either sides of the upper support plate 4 and the lower support plate 5 respectively. Either sides of the central portion 41 and 51 of the upper support plate 4 and the lower support plate 5 respectively extend to form two elongated necks which are linked to their corresponding end portions, forming the bridge type elastic arms 42, 43 and 52, 53.

The upper support plate 4 and the lower support plate 5 according to the present invention are sheet-like structures which are punched from steel sheets and subject to grinding subsequently. It is therefore preferable to have them undergone heat treatment to obtain better elasticity. In the present invention, each of the elastic arms 42, 43 and 52, 53 is configured to shape like a sheet-like neck portion; its thickness is preferably the same as that of the other parts of the upper support plate 4 or the lower support plate 5, so that the support plates may be speedily manufactured by punching prior to heat treatment and grinding, eliminating the step of special processing in the prior art. In addition, the upper support plate 4 or the lower support plate 5 of the present invention has its upper surface and lower surface excellently maintained in a parallel position, hence there is no need for fine adjustment or additional special adjusting elements during assembly. According to the present invention, the support plates may be quickly manufactured and the pair of separate electrodes may be kept parallel to each other.

As the neck portions of the support plates have a smaller surface area than the adjacent parts, they have a poorer rigidity. Therefore, as shown in FIG. 4, when the weight sensor according to the present invention receives a load Q, the neck portions at either sides of the support plates, i.e., the bridge type elastic arms, will perform compensational deformation so that, even though the space between the two electrodes 6, 7 varies, they may still be kept in a parallel state.

Preferred embodiments of the present invention are shown in FIGS. 1–7. The weight sensor of the present invention chiefly comprises a baseplate 8, the fixed portion 1 secured on the baseplate 8, the fixed portion 1 having an upper portion and a lower portion, said movable portion 2 having an upper portion and a lower portion, the loaded element 3 coupled to and supported on the movable portion 2, the sheet-like upper support plate 4 having two end portions individually coupled to the respective upper portions of the fixed portion 1 and the movable portion 2, the sheet-like support plate 5 having two end portions individually coupled to the respective lower portions of the fixed portion 1 and the movable portion 2, a stationary electrode 6 having one end thereof held at the fixed portion 1 and being horizontally maintained in the space between the upper support plate 4 and the lower support plate 5, a movable electrode 7 having one end thereof held at the movable portion 2 and being horizontally maintained in the space between the upper support plate 4 and lower support plate 5, the electrodes 6 and 7 being maintained in a parallel position.

The upper support plate 4 and the lower support plate 5 each consist of a central portion 41, 51 and bridge type elastic arms 42, 43 and 52, 53 extending from the respective central portions to the end portions of the respective support plates. The elastic arms have a thickness the same as that of the central portions, but have a smaller surface area than that of the central portions, so that when the loaded element 3 carries a load Q, causing the movable portion 2 to displace downwardly, the elastic arms will deform in compensation to cause the movable electrode 7 to displace, hence the movable electrode 7 may remain parallel to the stationary electrode 6.

Figure 1:
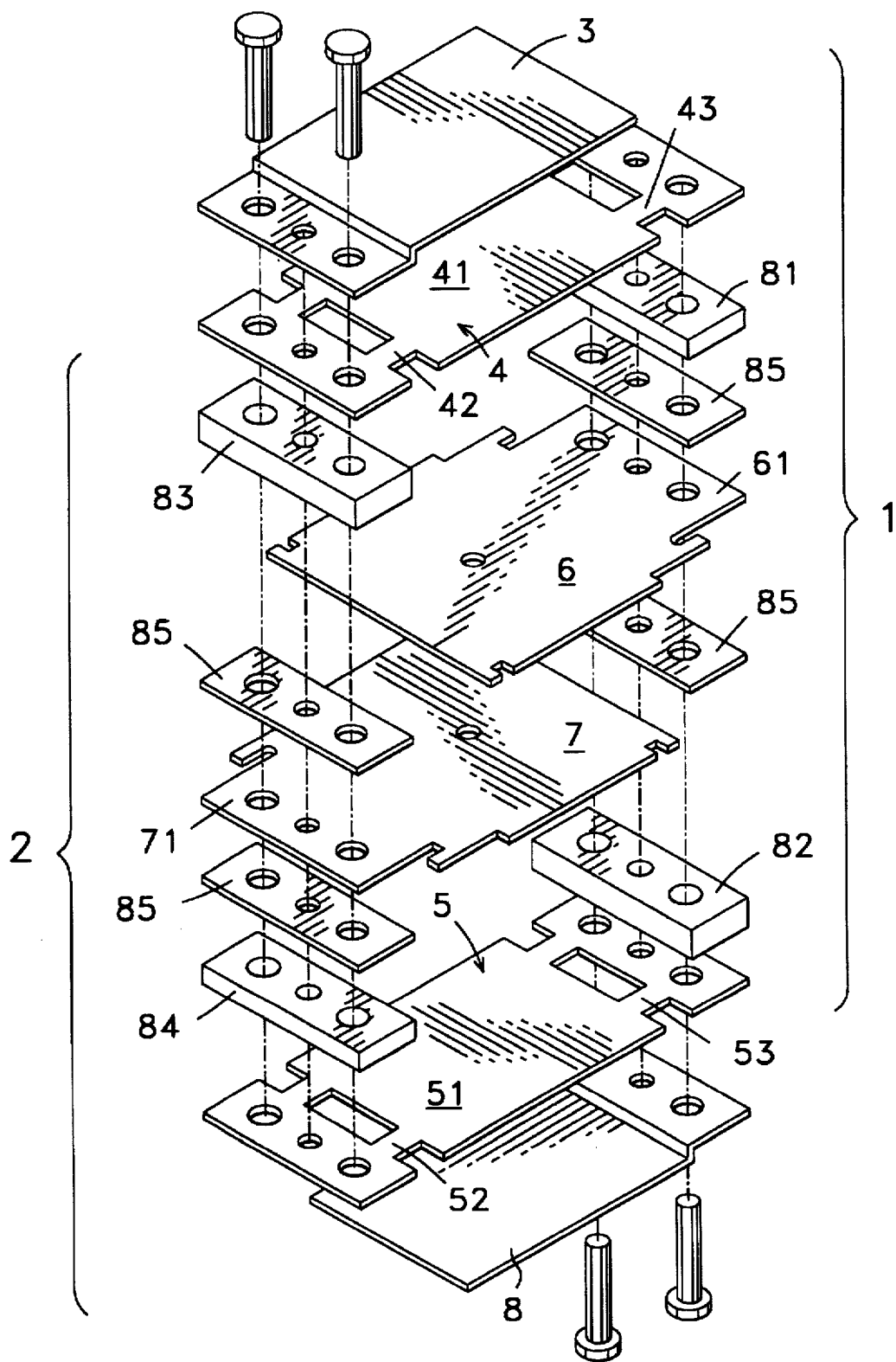
FIG. 1 is an exploded view of a preferred embodiment of the present invention.
Figure 4:
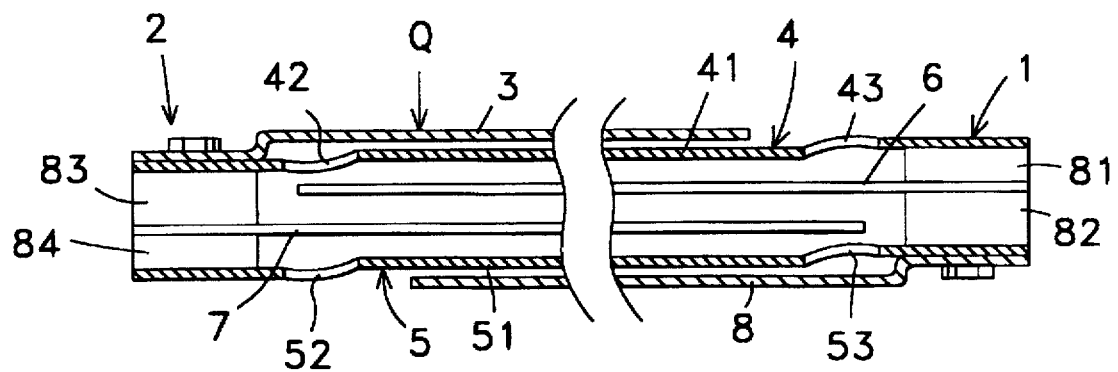
FIG. 4 is similar to FIG. 2, but showing the present invention in a loaded state.
Figure 5:
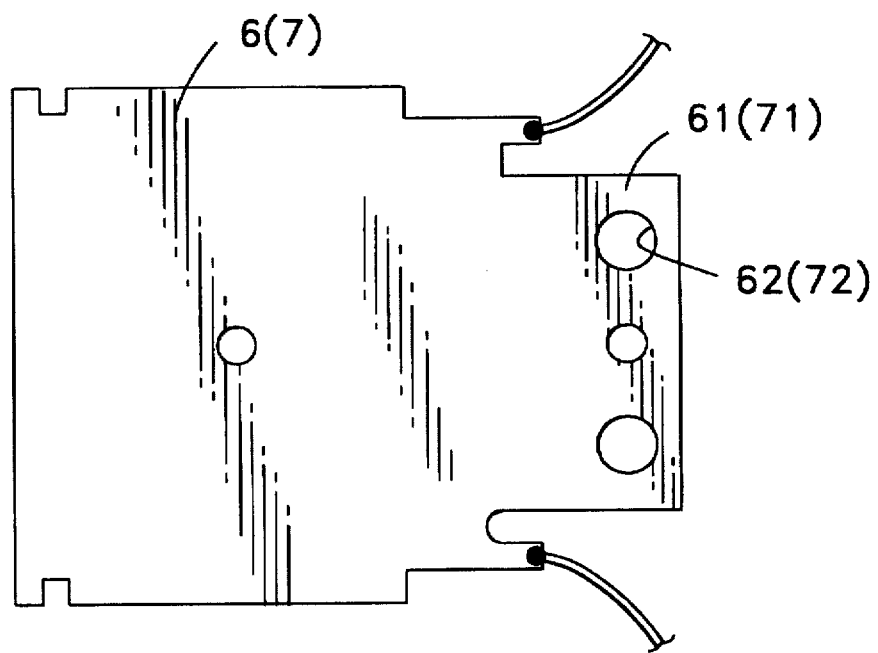
FIG. 5 is a plan view of a preferred embodiment of the electrode of the present invention.

As shown in FIGS. 1, 2 and 4, the stationary electrode 6 is secured to the fixed portion 1. A pad 81 is disposed between the upper support plate 4 and the stationary electrode 6, and another pad 82 is disposed between the lower support plate 5 and the stationary electrode 6. Similarly, pads 83 and 84 are disposed on both sides of the movable electrode 7 secured on the movable portion 2 between the upper support plate 4 and the lower support 5. After molding, the pads may undergo the grinding process so that their upper surfaces are parallel to their lower surfaces and they have uniform thickness all through.

Figure 6:
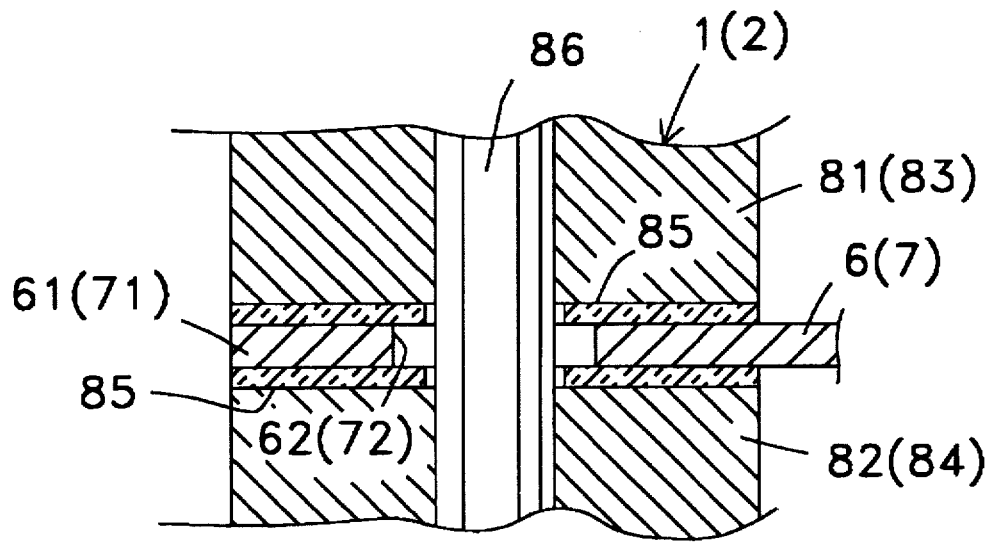
FIG. 6 is a partial sectional view of FIG. 2, showing the electrodes in an assembled state.
Figure 7:
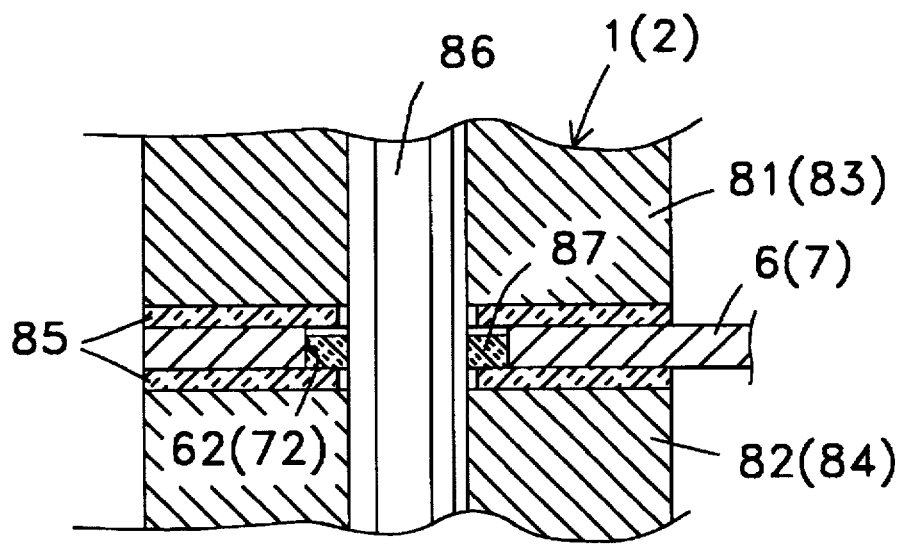
FIG. 7 is similar to FIG. 6, but showing another preferred embodiment of the electrode.
Figure 8:
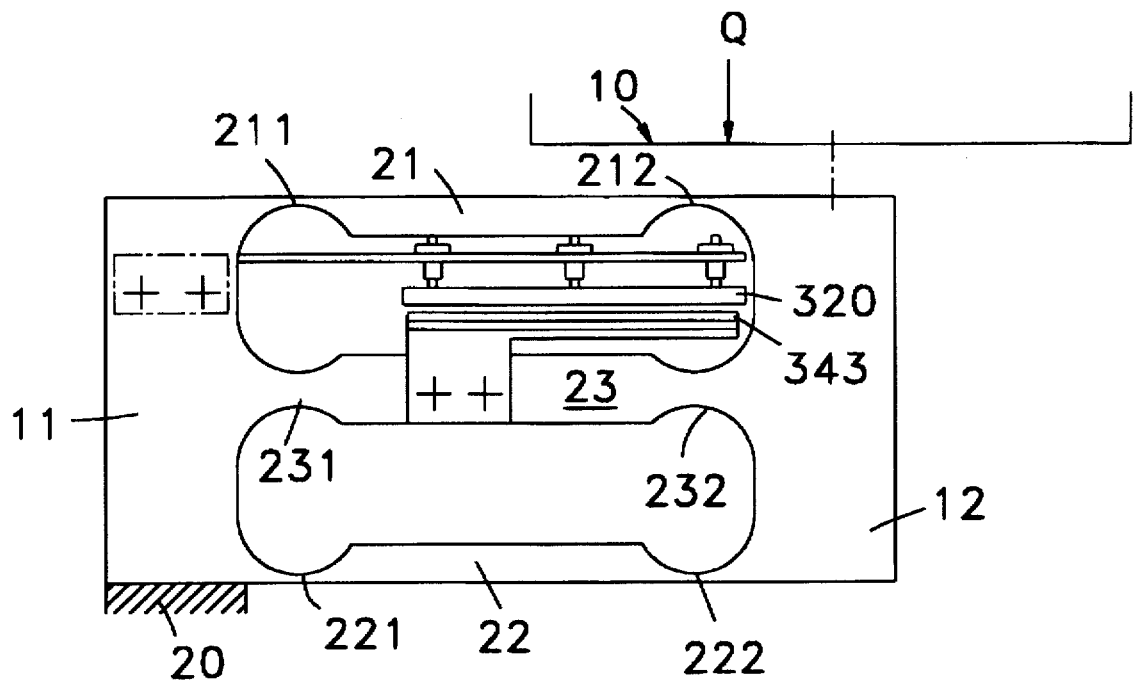
FIG. 8 is a side view of a prior weight sensor.

Conventional electrodes may be utilized in the present invention. The end of the electrode for securing to the fixed portion 1 or the movable portion 2 is generally riveted to a small area insulated plate, whereby the electrode may be secured to the fixed portion 1 or the movable portion 2 of the weight sensor. However, a more preferred embodiment of the electrode, as shown in FIG. 5, may be used in the present invention. A thin sheet of metal of even thickness is used to form the electrodes of the present invention. The electrode 6 (or 7) has a fixed end portion 61 (71) and does not need to be connected to any insulated plates. Like the support plates and the pads, the electrodes may be subject to grinding to obtain a uniform thickness. FIGS. 6 and 7 show the electrode 6 (or 7) of the present invention sandwiched between the pads 81 and 82 (or 83 and 84) of the fixed portion 1 (or the movable portion 2). An insulated plate 85 is disposed between the pads 81 and 82 (or 83 and 84) of the electrode 6 (or 7). The fixed end portion 61 (or 71) of the electrode 6 (or 7) has a hole 62 (or 72) which has an external diameter greater than that of a connecting element 86 such as a rivet, so that the connecting element 86 is not in contact with the electrode 6 (or 7). An annular insulated plate 87 may optionally be fitted in the hole 62 (or 72) as shown in FIG. 7. Furthermore, the rectangular hole defined between two neck portions of the bridge type elastic arms at either end of the support plates may be modified to be a plurality of circular holes.

Since all the components of the present invention may be speedily formed and ordinary grinding technique may be employed to ensure overall uniform thickness of the components, assembly is thus made easy and speedy. In addition to providing high precision, the weight sensor of the present invention is thinner and lighter.

Although the present invention has been illustrated and described with reference to the preferred embodiments thereof, it should be understood that it is in no way limited to the details of such embodiments, but is capable of numerous modifications within the scope of the appended claims.

What is claimed is:

1. A weight sensor with electrostatic capacitance, comprising:

a baseplate;

a fixed portion coupled and secured to said baseplate, said fixed portion having an upper portion and a lower portion;

a movable portion having an upper portion and a lower portion;

a loaded element coupled to and supported on said movable portion;

a sheet-like upper support plate having two end portions respectively coupled to the upper portions of said fixed portion and said movable portion;

a sheet-like lower support plate having two end portions respectively coupled to the lower portions of said fixed portion and said movable portion;

a stationary electrode having one end thereof secured to said fixed portion;

a movable electrode having one end thereof secured to said movable portion, said movable electrode being parallel to said stationary portion;

said upper support plate and said lower support plate each having a central portion and bridge-like elastic arms extending from said central portion to their respective end portions, said elastic arms having a thickness the same as that of said central portion, and a surface area smaller than that of said central portion, so that when said loaded element carries a load, causing said movable portion to displace downwardly, said elastic arms perform compensational deformation to cause said movable electrode to displace such that its parallel relationship with the stationary electrode is maintained.

2. A weight sensor with electrostatic capacitance as claimed in claim 1, wherein said stationary electrode is horizontally maintained in a space between said upper support plate and said lower support plate.

3. A weight sensor with electrostatic capacitance as claimed in claim 1, wherein a pad is disposed on either sides of said stationary electrode secured on said fixed portion between said upper support plate and said lower support plate, and a pad is disposed on either sides of said movable electrode secured on said movable portion between said upper support plate and said lower support plate.

4. A weight sensor with electrostatic capacitance as claimed in claim 1, wherein said stationary electrode or said movable electrode is a metal sheet having a uniform thickness.

5. A weight sensor with electrostatic capacitance as claimed in claim 1, wherein either sides of said central portion of said upper support plate and said lower support plate are connected to their corresponding end portions by means of at least two elongated neck portions so as to form said bridge type elastic arms.

6. A weight sensor with electrostatic capacitance as claimed in claim 3, wherein an insulated plate is disposed between said stationary electrode or said movable electrode and its corresponding pads.

* * * * *